United States Patent
Yang et al.

(10) Patent No.: US 11,641,687 B2
(45) Date of Patent: May 2, 2023

(54) NETWORK PROCESSING METHOD AND APPARATUS, CORE NETWORK, BASE STATION AND READABLE STORAGE MEDIUM

(71) Applicant: ZTE CORPORATION, Guangdong (CN)

(72) Inventors: Li Yang, Guangdong (CN); Zijiang Ma, Guangdong (CN); He Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 358 days.

(21) Appl. No.: 17/251,995

(22) PCT Filed: Apr. 23, 2019

(86) PCT No.: PCT/CN2019/083961
§ 371 (c)(1),
(2) Date: Dec. 14, 2020

(87) PCT Pub. No.: WO2019/242398
PCT Pub. Date: Dec. 26, 2019

(65) Prior Publication Data
US 2022/0046737 A1    Feb. 10, 2022

(30) Foreign Application Priority Data
Jun. 22, 2018  (CN) .......................... 201810654544.8

(51) Int. Cl.
*H04W 76/16*     (2018.01)
*H04L 65/1016*   (2022.01)
(Continued)

(52) U.S. Cl.
CPC ......... *H04W 76/16* (2018.02); *H04L 65/1016* (2013.01); *H04W 28/18* (2013.01); *H04W 48/20* (2013.01); *H04W 92/20* (2013.01)

(58) Field of Classification Search
CPC ..... H04W 76/15; H04W 76/16; H04W 28/18; H04W 92/20; H04W 36/0069; H04W 48/20; H04L 65/1016
See application file for complete search history.

(56) References Cited

U.S. PATENT DOCUMENTS

2019/0124572 A1*   4/2019   Park ................... H04W 36/0088
2019/0254097 A1*   8/2019   Prasad ............... H04W 12/0431
(Continued)

FOREIGN PATENT DOCUMENTS

CN      107872878 A     4/2018
CN      107889241 A     4/2018
(Continued)

OTHER PUBLICATIONS

Supplementary European Search Report for EP19823192.0, dated Feb. 15, 2022 (eight (8) pages).
(Continued)

Primary Examiner — Margaret G Mastrodonato
(74) Attorney, Agent, or Firm — KDW Firm PLLC

(57) ABSTRACT

Provided are a network processing method and apparatus, a core network, a base station and a computer readable storage medium. A core network side initiates an NG interface terminal radio capability check request message to a master base station, the NG interface terminal radio capability check request message including terminal radio capability information of a plurality of base stations accessed by a
(Continued)

Initiate an NG interface terminal radio capability check request message to a master base station — S401

Receive an NG interface terminal radio capability check response message fed back by the master base station — S402 terminal via dual-connectivity or multi-connectivity; and then the core network side receives an NG interface terminal radio capability check response message fed back by the master base station, the NG interface terminal radio capability check response message at least carrying indication information of whether the base stations support a specific service.

17 Claims, 7 Drawing Sheets

(51) Int. Cl.
*H04W 28/18* (2009.01)
*H04W 48/20* (2009.01)
*H04W 92/20* (2009.01)

(56) References Cited

U.S. PATENT DOCUMENTS

2020/0120750 A1* 4/2020 Liu .................. H04W 76/11
2020/0196208 A1* 6/2020 Li .................... H04W 36/00837

FOREIGN PATENT DOCUMENTS

| EP | 3826210 A1 | 5/2021 |
|----|------------|--------|
| WO | 2018062286 A1 | 4/2018 |
| WO | 2018086551 A1 | 5/2018 |

OTHER PUBLICATIONS

ZTE: Discussion on Function of UE Radio Capability Check over Xn, 3GPP Draft; R3-183644 Discussion on Function of UE Radio Capability Check Over XN V2, 3rd Generation Partnership Project (3GPP), Mobile Competence Centre; 650, Route Des Lucioles; F-06921 Sophia-Ant vol. RAN WG3, No. Montreal, Canada; Jul. 2, 2018- Jul. 6, 2018, Jul. 1, 2018 (Jul. 1, 2018), XP051467938, Retrieved from the Internet: URL:http://www.3gpp.org/ftp/Meetings%5F3GPP%5FSYNC/RAN3/DocS [retrieved on Jul. 1, 2018].

"3rd Generation Partnership Project; Technical Specification Group Radio Access Network; NG-RAN; NG Application Protocol (NGAP) (Release 15)", 3GPP Draft; 38413-090_CL, 3rd Generation Partnership Project (3GPP), Mobile Competence Centre; 650, Route Des Lucioles; F-06921 Sophia-Antipolis Cedex; France, Jun. 6, 2018 (Jun. 6, 2018), XP051527720, Retrieved from the Internet: URL:http://www.3gpp.org/ftp/tsg%5Fran/WG3%5Fiu/TSGR3%5FI00/Docs/R3%2DI83592%2Ezip [retrieved on Jun. 6, 2018].

"3rd Generation Partnership Project; Technical Specification Group Radio Access Network; Evolved Universal Terrestrial Radio Access (E-UTRA); Radio Resource Control (RRC); Protocol specification (Release 15)", 3GPP Standard; Technical Specification; 3GPP TS 36.331, 3rd Generation Partnership Project (3GPP), Mobile Competence Centre; 650, Route Des Lucioles; F-06921 Sophia-Antipolis Cedex; France, vol. RAN WG2, No. V15.2.1, Jun. 21, 2018 (Jun. 21, 2018), pp. 1-791, XP051473081, [retrieved on Jun. 21, 2018].

International Search Report for International application No. PCT/CN2019/083961, dated Jul. 19, 2019, 4 pages.

* cited by examiner

NETWORK PROCESSING METHOD AND APPARATUS, CORE NETWORK, BASE STATION AND READABLE STORAGE MEDIUM

CROSS-REFERENCE TO RELATED APPLICATIONS

This is a National Stage Application, filed under 35 U.S.C. 371, of International Patent Application No. PCT/CN2019/083961, filed on Apr. 23, 2019, which claims priority to Chinese patent application No. 201810654544.8 filed on Jun. 22, 2018, contents of both of which are incorporated herein by reference in their entireties.

TECHNICAL FIELD

The present disclosure relates to the technical field of mobile communications and, particularly, to a network processing method and apparatus, a base station, a core network, a base station and a readable storage medium.

BACKGROUND

A fourth generation (4G), also called long term evolution (LTE), cellular mobile communication system includes a 4G core network (CN) and a radio access network (RAN). The 4G CN includes basic network element nodes such as mobility management entity (MME), serving gateway (SGW) and public data network (PDN) gateway (PGW). The RAN includes evolved Node B (eNB). A 5th generation (5G) cellular mobile communication system includes a 5G core (5GC) and a next generation radio access network (NG-RAN). The 5GC includes basic network elements such as access mobility function (AMF), session management function (SMF) and user plane function (UPF). The NG-RAN includes base stations of at least two different radio access types (RAT): Ng-eNB (air interfaces still support Evolved Universal Terrestrial Radio Access (E-UTRA)) based on the evolution of 4G eNB, and newly designed gNB (air interfaces supporting new radio (NR)). An NG-RAN base station is connected to the 5GC through an NG interface (including NG-C control-plane connection and NG-U user-plane connection), and NG-RAN base stations are connected through an Xn interface (including Xn-C control-plane connection and Xn-U user-plane connection). The control-plane connection is used for transmitting control signaling messages between network elements, and the user-plane connection is used for transmitting user service data (packets).

For the 4G LTE system, the early design focuses on broadband data services in packet switch (PS) domain, such as transmission of large data files and various Internet data application services, therefore user voice services cannot be effectively supported at 4G LTE CN and RAN levels. When a user needs a voice service, fallback of voice over network service from 4G to 3G/2G is adopted. The fallback procedure will migrate the user equipment (UE) back to the network of old RAT. In subsequent evolution versions of LTE, the 4G CN level and the RAN level may optionally support the user voice services such as IMS Voice and VoLTE (i.e. Voice over LTE, which is a voice service based on IMS) through functional supplements and enhancements (such as semi-persistent scheduling (SPS) enhancement, transmission time interval (TTI) binding) to the 4G CN and RAN levels. At this time, the user voice services can be directly borne and served end-to-end in the 4G network, on the premise that both the network side and the UE support a voice enhancement function set corresponding to the IMS Voice.

For the 5G NG-RAN system, similarly, both the network side and the UE optionally support voice services. When one of the network side and the UE does not support the voice services, fallback to the network of old RAT is adopted.

In a 5G system, the UE supports single-connectivity (SC) and dual/multi-connectivity (DC/MC) configuration and operation functions for the UE. However, since the current NG interface UE radio capability check procedure disclosed by 3GPP is only oriented to the UE with 5G SC operation, but not to the UE with 5G DC/MC operation, the AMF/SMF can only know whether UE capability and function configuration on a master node (MN) side effectively support the IMS voice service; and the AMF/SMF cannot know whether the UE capability on a secondary node (SN) side and local function configuration on the SN side effectively support IMS Voice service. Therefore, the master base station MN can only always try to bear the IMS Voice service, as shown in FIG. 1. If the master base station MN cannot support the IMS Voice service either, the UE will be forced to exit the current 5G DC/MC operation and fall back to the network of old RAT, which will cause an inter-system handover or redirection operation, bring out a large amount of procedure signaling, and reduce the user service experience (because the comprehensive performance of the 4G/3G/2G network after fallback is not as good as the current 5G network in all aspects). However, if the secondary base station SN supports the IMS Voice service, network resources are obviously wasted. Moreover, besides the IMS Voice service, other services that 5G may bear, such as IMS Video, is processed in a manner similar to the processing of IMS Voice.

SUMMARY

The present disclosure provides a network processing method and apparatus, a core network, a base station and a computer readable storage medium.

An embodiment of the present disclosure provides a network processing method. The method includes the steps described below.

A core network side initiates an NG interface terminal radio capability check request message to a master base station, where the NG interface terminal radio capability check request message includes terminal radio capability information of a plurality of base stations accessed by a terminal via dual-connectivity or multi-connectivity.

An NG interface terminal radio capability check response message fed back by the master base station is received, where the NG interface terminal radio capability check response message at least carries indication information of whether the base stations support a specific service under the dual-connectivity or the multi-connectivity.

An embodiment of the present disclosure further provides a network processing method. The method includes the steps described below.

A master base station receives an NG interface terminal radio capability check response message initiated by a core network side, where the NG interface terminal radio capability check response message includes terminal radio capability information of a plurality of base stations accessed by a terminal via dual-connectivity or multi-connectivity.

An NG interface terminal radio capability check response message is fed back to the core network side, where the NG interface terminal radio capability check response message at least carries indication information of whether the base stations support a specific service under the dual-connectivity or the multi-connectivity.

An embodiment of the present disclosure further provides a network processing apparatus. The apparatus includes a request initiating module and a response receiving module.

The request initiating module is configured to initiate an NG interface terminal radio capability check request message to a master base station, where the NG interface terminal radio capability check request message includes terminal radio capability information of a plurality of base stations accessed by a terminal via dual-connectivity or multi-connectivity.

The response receiving module is configured to receive an NG interface terminal radio capability check response message fed back by the master base station, where the NG interface terminal radio capability check response message at least carries indication information of whether the base stations support a specific service under the dual-connectivity or the multi-connectivity.

An embodiment of the present disclosure further provides a network processing apparatus. The apparatus includes a request receiving module and a response sending module.

A request receiving module is configured to receive an NG interface terminal radio capability check request message initiated by a core network side, where the NG interface terminal radio capability check request message includes terminal radio capability information of a plurality of base stations accessed by a terminal via dual-connectivity or multi-connectivity.

The response sending module is configured to feed back an NG interface terminal radio capability check response message to the core network side, where the NG interface terminal radio capability check response message at least carries indication information of whether the base stations support a specific service under the dual-connectivity or the multi-connectivity.

An embodiment of the present disclosure further provides a core network. The core network includes a first processor, a first memory and a first communication bus.

The first communication bus is configured to implement connection and communication between the first processor and the first memory.

The first processor is configured to execute a computer program stored in the first memory, so as to perform the above network processing method.

An embodiment of the present disclosure further provides a base station. The base station includes a second processor, a second memory and a second communication bus.

The second communication bus is configured to implement connection and communication between the second processor and the second memory.

The second processor is configured to execute a computer program stored in the second memory, so as to perform the above network processing method.

An embodiment of the present disclosure further provides a computer readable storage medium. The computer readable storage medium is configured to store at least one program executable by at least one processor to implement the steps of the above network processing methods.

DETAILED DESCRIPTION

Figure 1:
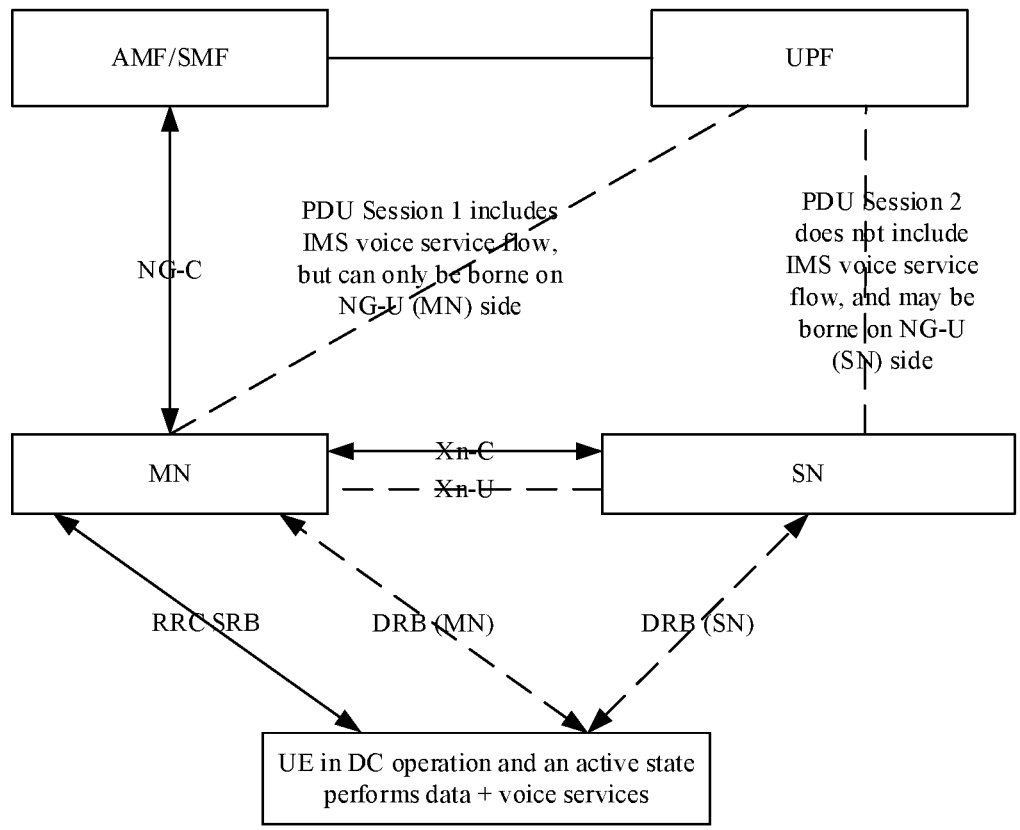
FIG. 1 is a schematic diagram of a 5G network communication architecture.
Figure 2:
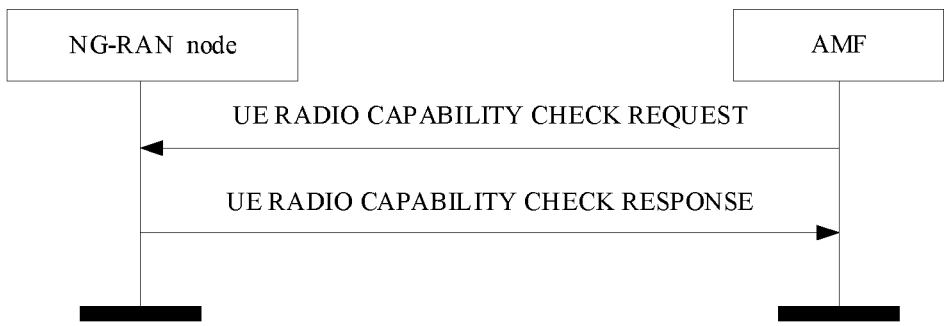
FIG. 2 is a flowchart of terminal radio capability detection.

For a 5G NG-RAN system, both a network side and a UE optionally support a voice service. When one of the network side and the UE cannot support the voice service, fallback to a network of old RAT is adopted. A terminal radio capability check procedure (as shown in FIG. 2) at an NG interface is introduced into the 5G system. Specifically, a 5GC control-plane entity AMF sends a terminal radio capability check request message to an NG-RAN Node (gNB or ng-eNB). Based on the terminal radio capability check request message, the NG-RAN Node determines whether UE radio capability and network side function configuration which are currently in service support an IMS Voice service. After the determination is completed, an IMS Voice Support Indicator is returned to an AMF through a terminal radio capability check response message. If the value of the IMS Voice Support Indicator is taken as Supported, it indicates that the AMF can directly establish and bear an IMS Voice service for the UE in the 5G network. If the value of the IMS Voice Support Indicator is taken as Not Supported, it indicates that the AMF cannot directly establish and bear the IMS Voice service in the 5G network for the UE in the future, and an NG-RAN will also adopt the fallback of the voice service from 5G to 4G/3G/2G network.

Figure 3:
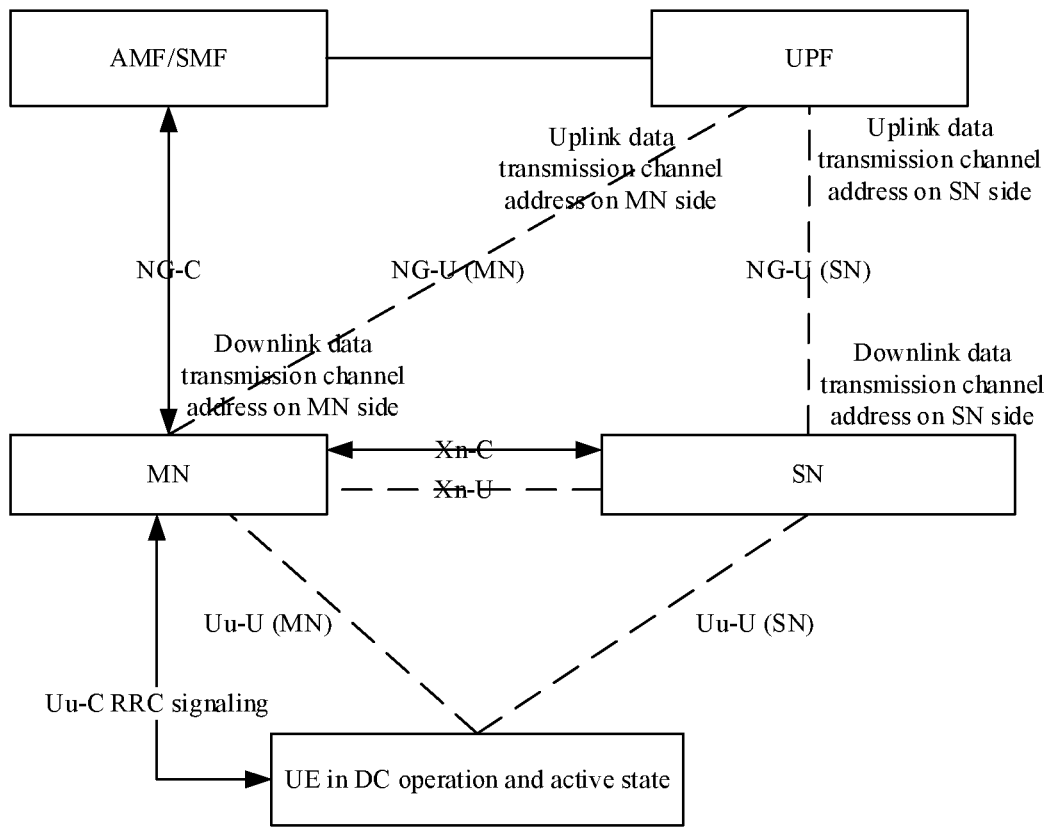
FIG. 3 is a schematic diagram of a 5G network communication architecture.

In a 5G system, UE supports single-connectivity (SC) and dual/multi-connectivity (DC/MC) configuration and operation functions. In the SC mode, the UE has only one data transmission channel (radio link) in terms of both air interface and network side. In the DC/MC mode, the UE has two or more data transmission channels (radio links) over both air interface and network side. For simplicity, the following example focuses on UE DC, while single-connectivity is a special case of the dual-connectivity when only a master node (MN) side is considered (all secondary data transmission channels/secondary radio links related to secondary nodes (SN) are deleted), and the MC is further extension of the DC for the configuration and operation of more links. In the DC mode, two separate radio link connections (air interface data transmission channels) can be respectively established and maintained between the UE and two NG-RAN base stations simultaneously over the air interface. One base station is referred to as the master base station (master node, MN) and the other base station is referred to as the secondary base station (secondary node, SN). Two separate network side (NG-U) connections (network data transmission channels) can be established and maintained between the MN and a user-plane network element entity UPF of the core network and between the SN and this UPF simultaneously over the NG interfaces. However, an NG-C connection can be maintained between only the MN and a control-plane network element entity AMF of the core network. FIG. 3 illustrates related architecture. In FIG. 3, a solid line represents control-plane connections between different network element nodes, which are used for transmitting network control signaling, are represented by solid lines; and user-plane connections between different network element nodes, which are used for transmitting user service data, are represented by dashed lines. The NG-U (MN) provides a data transmission channel between the UPF and the MN for transmitting uplink and downlink user service data packets borne by anchors on PDU Session/QoS Flows of the MN side. Similarly, the NG-U (SN) provides a data transmission channel between the UPF and the SN for transmitting uplink and downlink user service packets borne by anchors on "shunted" PDU Session/QoS Flows of the SN side. A plurality of data transmission channels on the MN side and the SN side are interactively established or modified through an NG-C+Xn-C control-plane signaling procedure. It should be noted that, since there is no NG-C control-plane connection between the SN and an AMF/SMF, all configuration information on the SN side must be interacted with the MN through an Xn-C control-plane link or be forwarded to the AMF/SMF through an MN relay.

Embodiments of the present disclosure are described in detail hereinafter through various implementations in conjunction with drawings. It is to be understood that the embodiments described herein are merely intended to explain the present disclosure, and are not intended to limit the present disclosure.

First Embodiment

Figure 4:
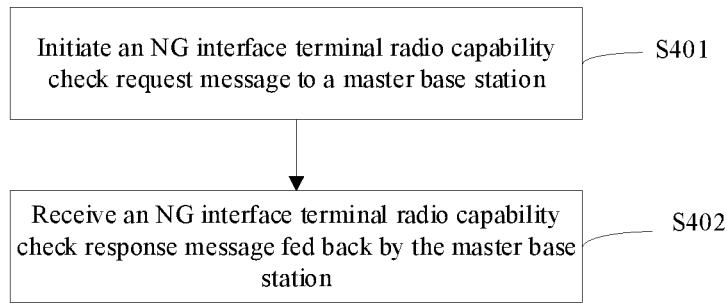
FIG. 4 is a flowchart of a network processing method according to an embodiment of the present disclosure.

Reference is made to FIG. 4. FIG. 4 is a flowchart of a network processing method according to a first embodiment of the present disclosure. The method includes the steps described below.

In step S401, a core network side initiates an NG interface terminal radio capability check request (NGAP: UE RADIO CAPABILITY CHECK REQUEST) message to a master base station, where the NGAP: UE RADIO CAPABILITY CHECK REQUEST message includes terminal radio capability information of a plurality of base stations accessed by a terminal via dual-connectivity or multi-connectivity.

In step S402, an NG interface terminal radio capability check response (NGAP: UE RADIO CAPABILITY CHECK RESPONSE) message fed back by the master base station is received, where the NGAP: UE RADIO CAPABILITY CHECK RESPONSE message at least carries indication information of whether the base stations support a specific service.

Figure 5:
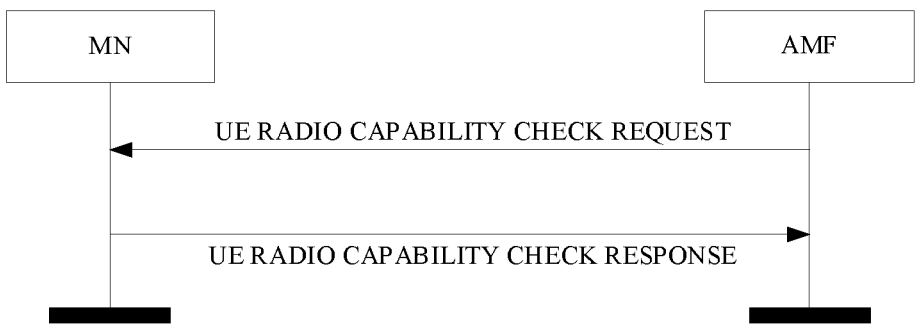
FIG. 5 is a signal flow diagram of a network processing method between a core network side and a master base station according to an embodiment of the present disclosure.

Reference is made to FIG. 5. FIG. 5 is a signal flow diagram of a network processing method according to an embodiment of the present disclosure, which relates to an interactive procedure between the core network side AMF on the core network side and the base station. The acquisition of the specific service that can be borne by the base station side is achieve through the NGAP: UE RADIO CAPABILITY CHECK REQUEST message and the NGAP: UE RADIO CAPABILITY CHECK RESPONSE message between the core network side and the base station, so that the master base station can allocate the current service accordingly.

Figure 6:
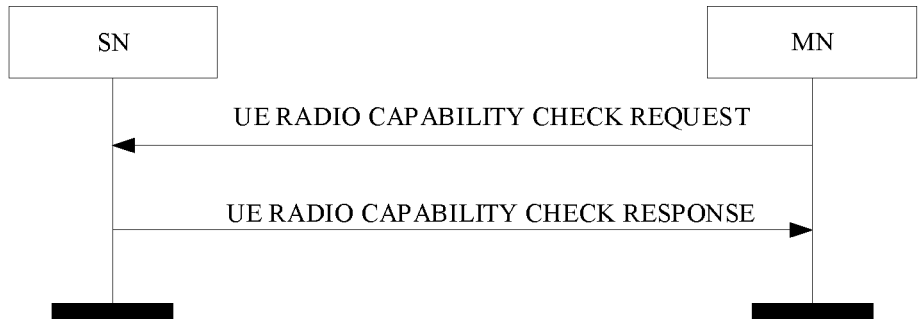
FIG. 6 is a signal flow diagram of a network processing method between a master base station and a secondary base station according to an embodiment of the present disclosure.

In some embodiments, referring to FIG. 6, the step of receiving the NGAP: UE RADIO CAPABILITY CHECK RESPONSE message fed back by the master base station may include the steps described below.

The master base station initiates an Xn interface terminal radio capability check request (XnAP: UE RADIO CAPABILITY CHECK REQUEST) message to a secondary base station, where the XnAP: UE RADIO CAPABILITY CHECK REQUEST message includes at least terminal radio capability information of a corresponding type for the secondary base station. That is, if the secondary base station (S-NG-RAN node) is a gNB, the XnAP: UE RADIO CAPABILITY CHECK REQUEST message includes terminal radio capability information, i.e. UE NR radio capability, of a UE corresponding to NR; if the secondary base station (S-NG-RAN node) is an ng-eNB, the XnAP: UE RADIO CAPABILITY CHECK REQUEST message includes terminal radio capability information, i.e. UE E-UTRA radio capability, of the UE corresponding to E-UTRA.

The secondary base station feeds back an Xn interface terminal radio capability check response (XnAP: UE RADIO CAPABILITY CHECK RESPONSE) message to the master base station, where the XnAP: UE RADIO CAPABILITY CHECK RESPONSE message carries indication information of whether the secondary base station supports a specific service. The "specific service" includes at least an IMS Voice service. That is, IMS Voice Support Indicator with S-Node=supported or not supported is carried. The above related information may be represented and borne by a single joint cell or a plurality of independent cells. In embodiments of the present disclosure, the term "joint cell" and the term "joint indication information" hereinafter specifically refers to: when one of the master base station (MN) or the secondary base station (SN) supports the "specific service", the value of the IMS Voice Support Indicator is set to supported; when neither the master base station (MN) nor the secondary base station (SN) supports the "specific service", the value of the IMS Voice Support Indicator is set to not supported, there is thus no need to introduce a separate new cell IMS Voice Support Indicator with S-Node in this case.

The core network side receives the NGAP: UE RADIO CAPABILITY CHECK RESPONSE message which is fed back by the master base station according to the XnAP: UE RADIO CAPABILITY CHECK RESPONSE message, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the XnAP: UE RADIO CAPABILITY CHECK RESPONSE message to the master base station may include a step described below.

Indication information of whether the terminal supports the specific service under different RATs respectively is carried in the XnAP: UE RADIO CAPABILITY CHECK RESPONSE message.

The indication information of whether the UE supports the specific service under different RATs including at least NR and E-UTRA respectively is included.

In some embodiments, the master base station initiates the XnAP: UE RADIO CAPABILITY CHECK REQUEST message to the secondary base station before or after the core network side initiates the NGAP: UE RADIO CAPABILITY CHECK REQUEST message to the master base station.

Figure 7:
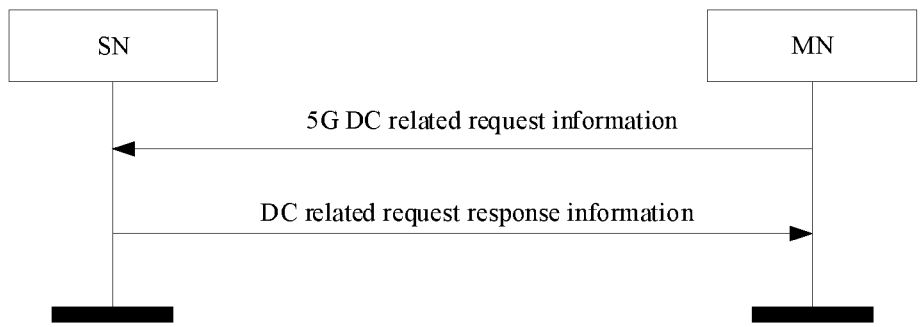
FIG. 7 is a signal flow diagram of a network processing method between a master base station and a secondary base station according to an embodiment of the present disclosure.

In some embodiments, referring to FIG. 7, the step of receiving the NGAP: UE RADIO CAPABILITY CHECK RESPONSE message fed back by the master base station may include the steps described below.

The master base station initiates Xn interface 5G DC related procedure information to the secondary base station, where the Xn interface 5G DC related procedure information includes at least terminal radio capability information of a corresponding type for the secondary base station. That is, if the secondary base station (S-NG-RAN node) is a gNB, the Xn interface 5G DC related procedure information includes terminal radio capability information of the UE corresponding to NR; if the secondary base station (S-NG-RAN node) is an ng-eNB, the Xn interface 5G DC related procedure information includes terminal radio capability information of the UE corresponding to E-UTRA.

The secondary base station feeds back Xn interface 5G DC related procedure response information to the master base station, where the Xn interface 5G DC related procedure response information carries indication information of whether the secondary base station supports the specific service. The specific service includes at least the IMS Voice service. That is, IMS Voice Support Indicator with S-Node=supported or not supported is carried. The above related information may be represented and borne by a single joint cell or a plurality of independent cells.

The core network side receives the NGAP: UE RADIO CAPABILITY CHECK RESPONSE message which is fed back by the master base station according to the Xn interface 5G DC related procedure response information, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the Xn interface 5G DC related procedure response information to the master base station may include a step described below.

Indication information of whether the terminal supports the specific service under different RATs respectively is carried in the Xn interface 5G DC related procedure response information. The indication information of whether the UE supports the specific service under different RATs including at least NR and E-UTRA respectively is included.

In some embodiments, the Xn interface 5G DC related procedure information includes any one of a secondary node addition request (S-NODE ADDITION REQUEST) message and a secondary node modification request (S-NODE MODIFICATION REQUEST) message.

When the Xn interface 5G DC related procedure information is the S-NODE ADDITION REQUEST message, the Xn interface 5G DC related procedure response information includes a secondary node addition request acknowledge (S-NODE ADDITION REQUEST ACKNOWLEDGE) message.

When the Xn interface 5G DC related procedure information is the S-NODE MODIFICATION REQUEST message, the Xn interface 5G DC related procedure response information includes a secondary node modification request acknowledge (S-NODE MODIFICATION REQUEST ACKNOWLEDGE) message.

In some embodiments, the master base station initiates the Xn interface 5G DC related procedure information to the secondary base station before or after the core network side initiates the NGAP: UE RADIO CAPABILITY CHECK REQUEST message to the master base station.

In some embodiments, the NGAP: UE RADIO CAPABILITY CHECK REQUEST message includes at least terminal radio capability information corresponding to two different RATs including NR and E-UTRA. In an embodiment, the indication information corresponding to different RATs including at least NR and E-UTRA of the UE, i.e. UE NR Radio Capability and UE E-UTRA Radio Capability, is included. The above terminal radio capability information corresponding to the different RATs may be represented and borne by a single joint cell or a plurality of independent cells.

In some embodiments, the specific service includes at least one of an IP multimedia subsystem (IMS) voice service or an IMS video service.

According to the network processing method provided in the embodiment of the present disclosure, a core network side initiates an NGAP: UE RADIO CAPABILITY CHECK REQUEST message to a master base station, where the NGAP: UE RADIO CAPABILITY CHECK REQUEST message includes terminal radio capability information of a plurality of base stations accessed by a terminal via dual-connectivity or multi-connectivity; and then an NGAP: UE RADIO CAPABILITY CHECK RESPONSE message fed back by the master base station is received, where the NGAP: UE RADIO CAPABILITY CHECK RESPONSE message at least carries indication information of whether the base stations support a specific service. Thereby, the message interaction between the core network side and the base station achieves the support of the specific service of the base stations accessed by the terminal via the dual-connectivity or multi-connectivity, thus providing convenience for the user to select the corresponding base station to bear the specific service and ensuring the user experience.

Second Embodiment

Figure 8:
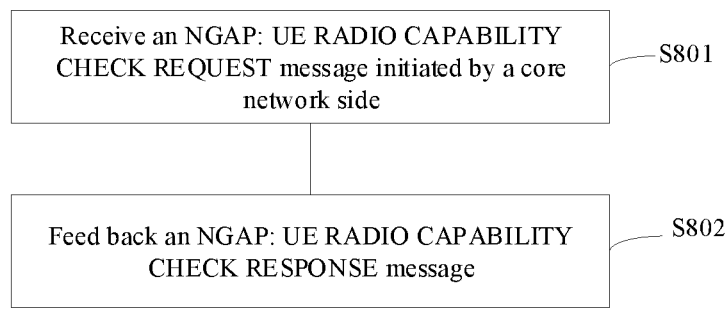
FIG. 8 is a flowchart of a network processing method according to an embodiment of the present disclosure.

Reference is made to FIG. 8. FIG. 8 is a flowchart of a network processing method according to a second embodiment of the present disclosure. The method includes the steps described below.

In step S801, a master base station receives an NGAP: UE RADIO CAPABILITY CHECK REQUEST message initiated by a core network side, where the NGAP: UE RADIO CAPABILITY CHECK REQUEST message includes terminal radio capability information of a plurality of base stations accessed by a terminal via dual-connectivity or multi-connectivity.

In step S802, an NGAP: UE RADIO CAPABILITY CHECK RESPONSE message is fed back to the core network side, where the NGAP: UE RADIO CAPABILITY CHECK RESPONSE message at least carries indication information of whether the base stations support a specific service.

In some embodiments, the step of feeding back the NGAP: UE RADIO CAPABILITY CHECK RESPONSE message to the core network side includes the steps described below.

The master base station initiates an Xn interface terminal radio capability check request (XnAP: UE RADIO CAPABILITY CHECK REQUEST) message to a secondary base station, where the XnAP: UE RADIO CAPABILITY CHECK REQUEST message includes at least terminal radio capability information of a corresponding type for the secondary base station. That is, if the secondary base station (S-NG-RAN node) is a gNB, the XnAP: UE RADIO CAPABILITY CHECK REQUEST message includes terminal radio capability information, i.e. UE NR radio capability, of a UE corresponding to NR; if the secondary base station (S-NG-RAN node) is an ng-eNB, the XnAP: UE RADIO CAPABILITY CHECK REQUEST message includes terminal radio capability information, i.e. UE E-UTRA radio capability, of the UE corresponding to E-UTRA.

The secondary base station feeds back an Xn interface terminal radio capability check response (XnAP: UE RADIO CAPABILITY CHECK RESPONSE) message to the master base station, where the XnAP: UE RADIO CAPABILITY CHECK RESPONSE message carries indication information of whether the secondary base station supports a specific service. The "specific service" includes at least an IMS Voice service. That is, IMS Voice Support Indicator with S-Node=supported or not supported is carried. The above related information may be represented and borne by a single joint cell or a plurality of independent cells. The term "joint cell" and the term "joint indication information" hereinafter specifically refers to: when one of the master base station (MN) or the secondary base station (SN) supports the "specific service", the value of the IMS Voice Support Indicator is set to supported; when neither the master base station (MN) nor the secondary base station (SN) supports the "specific service", the value of the IMS Voice Support Indicator is set to not supported, there is thus no need to introduce a separate new cell IMS Voice Support Indicator with S-Node in this case.

The NGAP: UE RADIO CAPABILITY CHECK RESPONSE message is fed back to the core network side according to the XnAP: UE RADIO CAPABILITY CHECK RESPONSE message, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the XnAP: UE RADIO CAPABILITY CHECK RESPONSE message to the master base station may include a step described below.

Indication information of whether the terminal supports the specific service under different RATs respectively is carried in the XnAP: UE RADIO CAPABILITY CHECK RESPONSE message. The indication information of whether the UE supports the specific service under different RATs including at least NR and E-UTRA respectively is included.

In some embodiments, the master base station initiates the XnAP: UE RADIO CAPABILITY CHECK REQUEST message to the secondary base station before or after the core network side initiates the NGAP: UE RADIO CAPABILITY CHECK REQUEST message to the master base station.

In some embodiments, the step of feeding back the NGAP: UE RADIO CAPABILITY CHECK RESPONSE message to the core network side may include the steps described below.

The master base station initiates Xn interface 5G DC related procedure information to the secondary base station, where the Xn interface 5G DC related procedure information includes at least terminal radio capability information of a corresponding type for the secondary base station. That is, if the secondary base station (S-NG-RAN node) is a gNB, the Xn interface 5G DC related procedure information includes terminal radio capability information of the UE corresponding to NR; if the secondary base station (S-NG-RAN node) is an ng-eNB, the Xn interface 5G DC related procedure information includes terminal radio capability information of the UE corresponding to E-UTRA.

The secondary base station feeds back Xn interface 5G DC related procedure response information to the master base station, where the Xn interface 5G DC related procedure response information carries indication information of whether the secondary base station supports the specific service. The specific service includes at least the IMS Voice service. That is, IMS Voice Support Indicator with S-Node=supported or not supported is carried. The above related information may be represented and borne by a single joint cell or a plurality of independent cells.

The NGAP: UE RADIO CAPABILITY CHECK RESPONSE message is fed back to the core network side according to the Xn interface 5G DC related procedure response information, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the Xn interface 5G DC related procedure response information to the master base station may include a step described below.

Indication information of whether the terminal supports the specific service under different RATs respectively is carried in the Xn interface 5G DC related procedure response information. The indication information of whether the UE supports the specific service under different RATs including at least NR and E-UTRA respectively is included.

In some embodiments, the Xn interface 5G DC related procedure information includes any one of a secondary node addition request (S-NODE ADDITION REQUEST) message and a secondary node modification request (S-NODE MODIFICATION REQUEST) message.

When the Xn interface 5G DC related procedure information is the S-NODE ADDITION REQUEST message, the Xn interface 5G DC related procedure response information includes a secondary node addition request acknowledge (S-NODE ADDITION REQUEST ACKNOWLEDGE) message.

When the Xn interface 5G DC related procedure information is the S-NODE MODIFICATION REQUEST message, the Xn interface 5G DC related procedure response information includes a secondary node modification request acknowledge (S-NODE MODIFICATION REQUEST ACKNOWLEDGE) message.

In some embodiments, the master base station initiates the Xn interface 5G DC related procedure information to the secondary base station before or after the core network side initiates the NGAP: UE RADIO CAPABILITY CHECK REQUEST message to the master base station.

In some embodiments, the NGAP: UE RADIO CAPABILITY CHECK REQUEST message includes at least terminal radio capability information corresponding to two different RATs including NR and E-UTRA. In an embodiment, the indication information corresponding to different RATs including at least NR and E-UTRA of the UE, i.e. UE NR Radio Capability and UE E-UTRA Radio Capability, is included. The above terminal radio capability information corresponding to the different RATs may be represented and borne by a single joint cell or a plurality of independent cells.

In some embodiments, the specific service includes at least one of an IP multimedia subsystem (IMS) voice service or an IMS video service.

According to the network processing method provided in the embodiment of the present disclosure, a core network side initiates an NGAP: UE RADIO CAPABILITY CHECK REQUEST message to a master base station, where the NGAP: UE RADIO CAPABILITY CHECK REQUEST message includes terminal radio capability information of a plurality of base stations accessed by a terminal via dual-connectivity or multi-connectivity; and then an NGAP: UE RADIO CAPABILITY CHECK RESPONSE message fed back by the master base station is received, where the NGAP: UE RADIO CAPABILITY CHECK RESPONSE message at least carries indication information of whether the base stations support a specific service. Thereby, the message interaction between the core network side and the base station achieves the support of the specific service of the base stations accessed by the terminal via the dual-connectivity or multi-connectivity, thus providing convenience for the user to select the corresponding base station to bear the specific service and ensuring the user experience.

Third Embodiment

Figure 9:
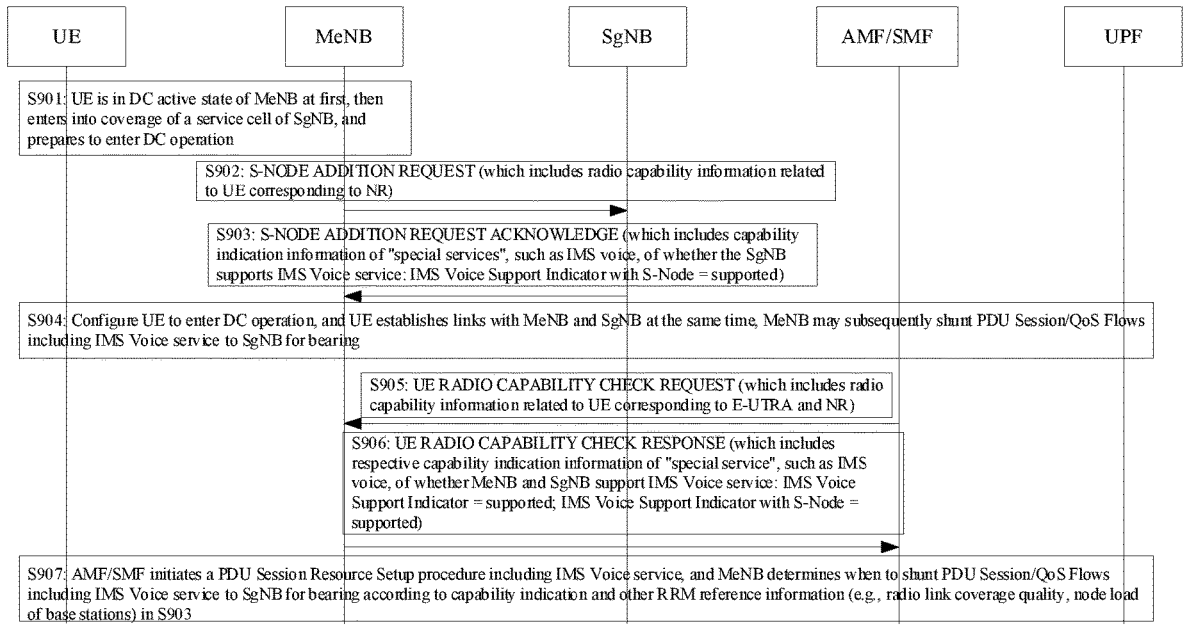
FIG. 9 is a signal flow diagram of a network processing method according to an embodiment of the present disclosure.

Reference is made to FIG. 9. FIG. 9 is a signal flow diagram of a network processing method according to this embodiment.

In this embodiment, a UE supports NGEN-DC configuration and operation, and local functions and capability sets of the UE, a master base station (MeNB) and a secondary base station (SgNB) also support an IMS Voice service.

In step S901, the UE is in a single-connectivity active state of the MeNB at first, then enters into coverage of a serving cell of the SgNB, and prepares to enter the NGEN-DC configuration and operation.

In step S902, the MeNB determines that the MeNB needs to establish the NGEN-DC operation with the target SgNB based on radio resource management (RRM) measurement and reporting of the UE, and the MeNB sends an SN Addition Request message to a target SgNB, where the SN Addition Request message includes necessary SCG configuration assistance parameters, and at least further includes terminal radio capability information (UE NR Radio Capability) related to the UE corresponding to NR.

In step S903, the SgNB returns an SN Addition Request Acknowledge message to the MeNB, where the SN Addition Request Acknowledge message includes necessary SCG configuration result information, and at least further includes capability indication information of whether the SgNB supports the IMS Voice service, such as: IMS Voice Support Indicator with S-Node=supported.

In step S904, the MeNB configures the UE to enter the NGEN-DC operation, and the UE establishes radio links with the MeNB and the SgNB at the same time. Since the MeNB knows that the SgNB supports the IMS Voice service, the MeNB may subsequently shunt PDU Session/QoS Flows including the IMS Voice service to the SgNB for bearing a service.

In step S905, an AMF/SMF prepares to initiate the IMS Voice service. For security, the AMF/SMF first initiates an NGAP: UE RADIO CAPABILITY CHECK REQUEST message to the MeNB, where the NGAP: UE RADIO CAPABILITY CHECK REQUEST message includes terminal radio capability information related to the UE corresponding to E-UTRA and NR.

In step S906, according to the previous determination inside the MeNB that both the master base station and the secondary base station support the IMS Voice service capability, an NGAP: UE RADIO CAPABILITY CHECK RESPONSE message is returned to the AMF/SMF, where the NGAP: UE RADIO CAPABILITY CHECK RESPONSE message includes the capability indication information indicating support of the current serving MeNB and SgNB to the IMS Voice service respectively, for example: IMS Voice Support Indicator=supported represents that the MeNB supports the IMS Voice service!; and IMS Voice Support Indicator with S-Node=supported represents that the SgNB supports the IMS Voice service!.

In step S907, upon receipt of respective capability information indicating the support to the IMS Voice service of the current master base station and the current secondary base station, the AMF/SMF subsequently initiates a PDU Session Resource Setup procedure including the IMS Voice service, and the MeNB determines when to shunt the PDU Session/QoS Flows including the IMS Voice service to the SgNB for bearing according to the capability indication of the IMS Voice Support Indicator with S-Node=supported and other RRM reference information (e.g., radio link coverage quality, node load of the master base station, and node load of the secondary base station) in the step S903.

Fourth Embodiment

Figure 10:
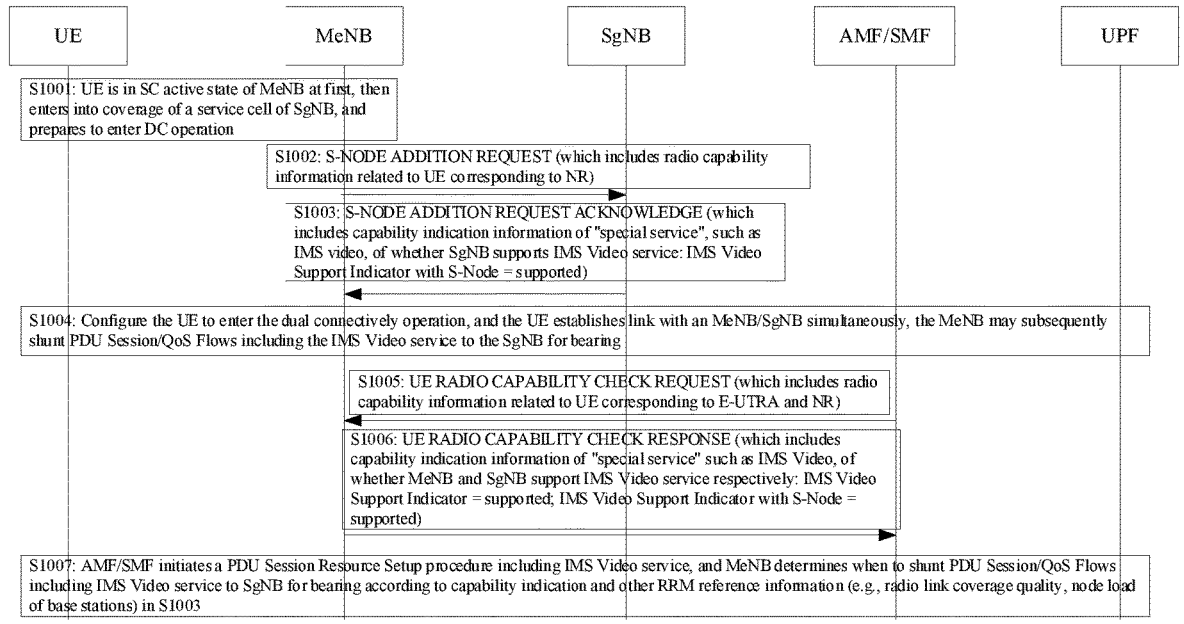
FIG. 10 is a signal flow diagram of a network processing method according to an embodiment of the present disclosure.

Reference is made to FIG. 10, FIG. 10 is a signal flow diagram of a network processing method according to this embodiment.

In this embodiment, a UE supports NGEN-DC configuration and operation, and local functions and capability sets of the UE and a secondary base station (SgNB) also support an IMS Video service, and a master base station MeNB does not support the IMS Video service.

In step S1001, the UE is in a single-connectivity active state with the MeNB at first, then enters into coverage of a serving cell of the SgNB, and prepares to enter the NGEN-DC configuration and operation.

In step S1002, the MeNB determines that the MeNB needs to establish the NGEN-DC operation with the target SgNB based on RRM measurement and reporting of the UE, and the MeNB sends an SN Addition Request message to a target SgNB, where the SN Addition Request message includes necessary SCG configuration assistance parameters, and at least further includes terminal radio capability information (UE NR Radio Capability) related to the UE corresponding to NR.

In step S1003, the SgNB returns an SN Addition Request Acknowledge message to the MeNB, where the SN Addition Request Acknowledge message includes necessary SCG configuration result information, and at least further includes capability indication information of whether the SgNB supports the IMS Video service, such as: IMS Video Support Indicator with S-Node=supported.

In step S1004, the MeNB configures the UE to enter the NGEN-DC operation, and the UE establishes radio links with the MeNB and the SgNB at the same time. Since the MeNB knows that the SgNB supports the IMS Video service, the MeNB may subsequently shunt PDU Session/QoS Flows including the IMS Video service to the SgNB for bearing a service.

In step S1005, an AMF/SMF prepares to initiate the IMS Video service. For security, the AMF/SMF first initiates an NGAP: UE RADIO CAPABILITY CHECK REQUEST message to the MeNB, where the NGAP: UE RADIO CAPABILITY CHECK REQUEST message contains terminal radio capability information related to the UE corresponding to E-UTRA and NR.

In step S1006, according to the previous determination inside the MeNB that the master base station MeNB does not support the IMS Video service capability while the secondary base station SgNB supports the IMS Video service capability, an NGAP: UE RADIO CAPABILITY CHECK RESPONSE message is returned to the AMF/SMF, where the NGAP: UE RADIO CAPABILITY CHECK RESPONSE message includes the capability indication information indicating support of the current serving MeNB and SgNB to the IMS Video service respectively, for example: IMS Video Support Indicator=not supported represents that the MeNB does not support the IMS Video service!; IMS Video Support Indicator with S-Node=supported represents that the SgNB supports the IMS Video service!.

In step S1007, upon receipt of respective capability information indicating the support of the current master base station and the secondary base station to the IMS Video service, the AMF/SMF subsequently initiates a PDU Session Resource Setup procedure including the IMS Video service, and the MeNB determines to immediately shunt the PDU Session/QoS Flows including the IMS Voice service to the SgNB for bearing according to the capability indication of the IMS Video Support Indicator with S-Node=supported and other RRM reference information (e.g., radio link coverage quality, node load of the master base station, and node load of the secondary base stations) in step S1003.

Fifth Embodiment

Figure 11:
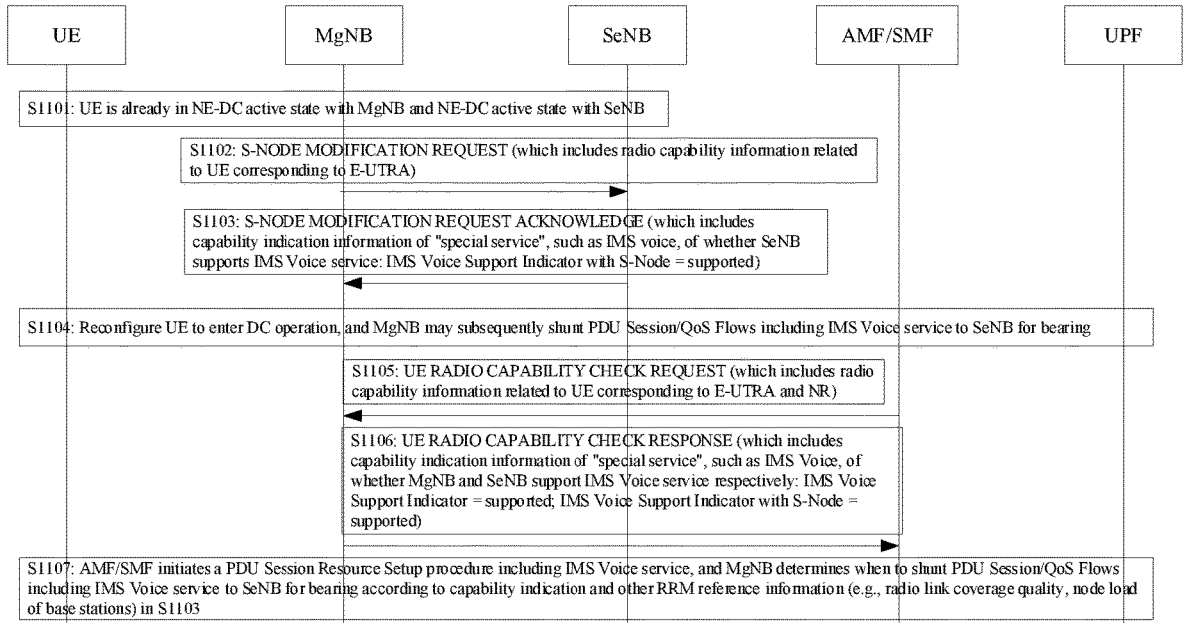
FIG. 11 is a signal flow diagram of a network processing method according to an embodiment of the present disclosure.

Reference is made to FIG. 11. FIG. 11 is a signal flow diagram of a network processing method according to this embodiment.

In this embodiment, a UE supports NE-DC configuration and operation, and local functions and capability sets of the UE, a master base station (MgNB) and a secondary base station (SeNB) also support an IMS Voice service.

In step S1101, the UE is already in an NE-DC active state with the MgNB and an NE-DC active state with the SeNB.

In step S1102, the MgNB determines that current SCG configuration in the SeNB needs to be updated and modified based on RRM measurement and reporting of the UE, and the MgNB sends an SN Modification Request message to the SeNB, where the SN Modification Request message includes necessary SCG reconfiguration assistance parameters, and at least further includes terminal radio capability information UE E-UTRA Radio Capability related to the UE corresponding to E-UTRA.

In step S1103, the SeNB returns an SN Modification Request Acknowledge message to the MgNB, where the SN Modification Request Acknowledge includes necessary SCG reconfiguration result information, and at least further includes capability indication information of whether the SeNB supports the IMS Voice service, such as: IMS Voice Support Indicator with S-Node=supported.

In step S1104, the MgNB reconfigures the UE to enter the NE-DC operation. Since the MgNB knows that the SeNB supports the IMS Voice service, the MgNB may subsequently shunt PDU Session/QoS Flows including the IMS Voice service to the SeNB for bearing a service.

In step S1105, an AMF/SMF prepares to initiate the IMS Voice service. For security, the AMF/SMF first initiates an NGAP: UE RADIO CAPABILITY CHECK REQUEST message to the MgNB, where the NGAP: UE RADIO CAPABILITY CHECK REQUEST message contains terminal radio capability information related to the UE corresponding to E-UTRA and NR.

In step S1106, according to the previous determination inside the MgNB that both the master base station and the secondary base station support the IMS Voice service capability, an NGAP: UE RADIO CAPABILITY CHECK RESPONSE message is returned to the AMF/SMF, where the NGAP: UE RADIO CAPABILITY CHECK RESPONSE message includes the capability indication information indicating support of the current serving MgNB and SeNB to the IMS Voice service respectively, for example: IMS Voice Support Indicator=supported represents that the MgNB supports the IMS Voice service!; IMS Voice Support Indicator with S-Node=supported represents that the SeNB supports the IMS Voice service!.

In step S1107, upon receipt of respective capability information indicating the support of the current master base station and the secondary base station to the IMS Voice service, the AMF/SMF subsequently initiates a PDU Session Resource Setup procedure including the IMS Voice service, and the MgNB determines when to shunt the PDU Session/QoS Flows including the IMS Voice service to the SeNB for bearing according to the new capability indication of the IMS Voice Support Indicator with S-Node=supported and other RRM reference information (e.g., radio link coverage quality, node load of the master base station, and node load of the secondary base station) in step S1103.

Sixth Embodiment

Figure 12:
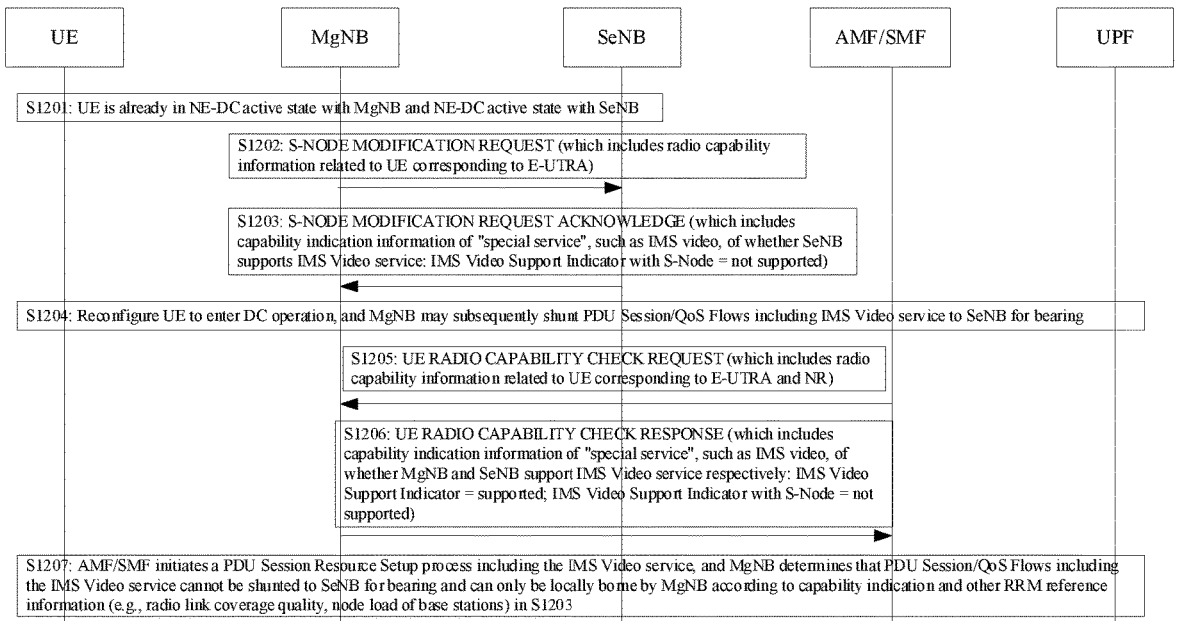
FIG. 12 is a signal flow diagram of a network processing method according to an embodiment of the present disclosure.

Reference is made to FIG. 12. FIG. 12 is a signal flow diagram of a network processing method according to this embodiment.

In this embodiment, a UE supports NE-DC configuration and operation, and local functions and capability sets of the UE and a master base station (MgNB) also support an IMS Video service, and a secondary base station SgNB does not support the IMS Video service.

In step S1201, the UE is already in an NE-DC active state with the MgNB and an NE-DC active state with the SeNB.

In step S1202, the MgNB determines that current SCG configuration in the SeNB needs to be updated and modified based on RRM measurement and reporting of the UE, and the MgNB sends an SN Modification Request message to the SeNB, where the SN Modification Request message includes necessary SCG reconfiguration assistance parameters, and at least further includes terminal radio capability information UE E-UTRA Radio Capability related to the UE corresponding to E-UTRA.

In step S1203, the SeNB returns an SN Modification Request Acknowledge message to the MgNB, where the SN Modification Request Acknowledge message includes necessary SCG reconfiguration result information, and at least further includes capability indication information of whether the SeNB supports the IMS Video service, such as: IMS Video Support Indicator with S-Node=supported.

In step S1204, the MgNB reconfigures the UE to enter the NE-DC operation. Since the MgNB knows that SeNB does not support the IMS Video service, the MgNB will not shunt PDU Session/QoS Flows including the IMS Video service to the SeNB for bearing a service.

In step S1205, an AMF/SMF prepares to initiate the IMS Video service. For security, the AMF/SMF first initiates an NGAP: UE RADIO CAPABILITY CHECK REQUEST message to the MgNB, where the NGAP: UE RADIO CAPABILITY CHECK REQUEST message contains terminal radio capability information related to the UE corresponding to E-UTRA and NR.

In step S1206, according to the previous determination inside the MgNB that the master base station MgNB supports the IMS Video service capability and the secondary base station SeNB does not support the IMS Video service capability, the MgNB returns an NGAP: UE RADIO CAPABILITY CHECK RESPONSE message to the AMF/SMF, where the NGAP: UE RADIO CAPABILITY CHECK RESPONSE message includes the capability indication information indicating support of the current serving MgNB and SeNB to the IMS Video service respectively, for example: IMS Video Support Indicator=supported represents that the MgNB supports the IMS Video service!; and IMS Video Support Indicator with S-Node=not supported represents that the SeNB does not support the IMS Video service!.

In step S1207, upon receipt of respective capability information indicating the support of the current master base station and the secondary base station to the IMS Video service, the AMF/SMF subsequently initiates a PDU Session Resource Setup procedure including the IMS Video service, and the MgNB determines that the PDU Session/QoS Flows including the IMS Video service cannot be shunted to the SeNB for bearing and can only be borne locally by the MgNB according to the new capability indication of the IMS Video Support Indicator with S-Node=not supported and other RRM reference information (e.g., radio link coverage quality, node load of the master base station, and node load of the secondary base station) in step S1203.

Seventh Embodiment

Figure 13:
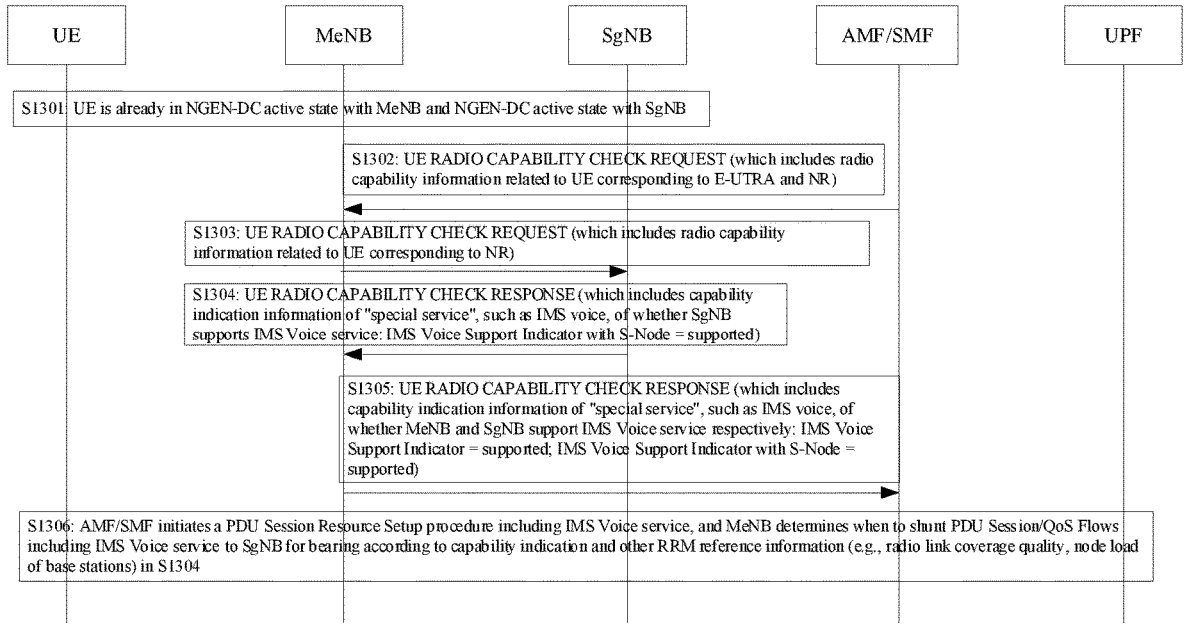
FIG. 13 is a signal flow diagram of a network processing method according to an embodiment of the present disclosure.

Reference is made to FIG. 13. FIG. 13 is a signal flow diagram of a network processing method according to this embodiment.

In this embodiment, a UE supports NGEN-DC configuration and operation, and local functions and capability sets of the UE, an MeNB and an SgNB support an IMS Voice service.

In step S1301, the UE is already in an NGEN-DC active state with the MeNB and an NGEN-DC active state with the SgNB.

In step S1302, an AMF/SMF prepares to initiate the IMS Voice service. For security, the AMF/SMF first initiates an NGAP: UE RADIO CAPABILITY CHECK REQUEST message to the MeNB, where the NGAP: UE RADIO CAPABILITY CHECK REQUEST message contains terminal radio capability information related to the UE corresponding to E-UTRA and NR.

In step S1303, the MeNB further sends an XnAP: UE RADIO CAPABILITY CHECK REQUEST message to the SgNB, where the XnAP: UE RADIO CAPABILITY CHECK REQUEST message contains terminal radio capability information related to the UE corresponding to NR.

In step S1304, the SgNB returns an XnAP: UE RADIO CAPABILITY CHECK RESPONSE message to the MeNB, where the XnAP: UE RADIO CAPABILITY CHECK RESPONSE message contains capability indication information of whether the SgNB support the IMS Voice, such as: IMS Voice Support Indicator with S-Node=supported.

In step S1305, according to the previous determination inside the MeNB that the master base station MeNB supports the IMS Voice capability and the secondary base station SgNB also supports the IMS Voice capability, the MeNB returns an NGAP: UE RADIO CAPABILITY CHECK RESPONSE message to the AMF/SMF, where the NGAP: UE RADIO CAPABILITY CHECK RESPONSE message includes the capability indication information indicating support of the current serving MeNB and SgNB to the capability indication information of the IMS Voice respectively, for example: IMS Voice Support Indicator=supported represents that the MeNB supports the IMS Voice service!; and IMS Voice Support Indicator with S-Node=supported represents that the SgNB supports the IMS Voice service!.

In step S1306, upon receipt of respective capability information indicating the support of the current master base station and the secondary base station to the IMS Voice, the AMF/SMF subsequently initiates a PDU Session Resource Setup procedure including the IMS Voice service, and the MeNB determines when to shunt the PDU Session/QoS Flows including the IMS Voice service to the SgNB for bearing according to the capability indication of the IMS Voice Support Indicator with S-Node=supported and other RRM reference information (e.g., radio link coverage quality, node load of the master base station, and node load of the secondary base station) in step S1304.

Eighth Embodiment

Figure 14:
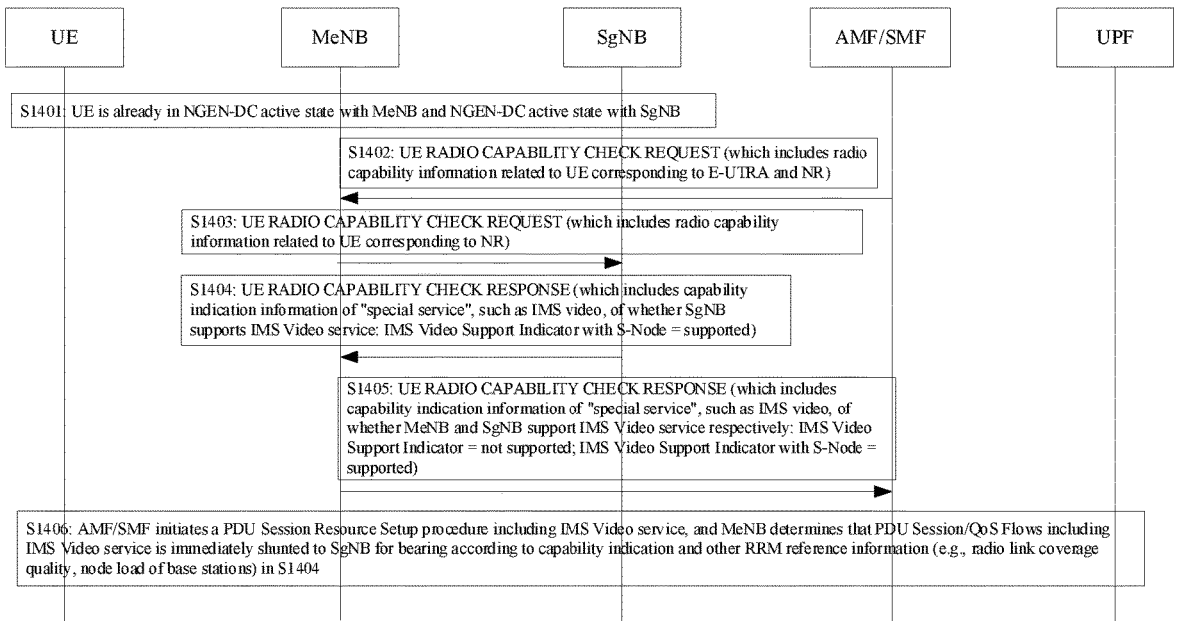
FIG. 14 is a signal flow diagram of a network processing method according to an embodiment of the present disclosure.

Reference is made to FIG. 14. FIG. 14 is a signal flow diagram of a network processing method according to this embodiment.

In this embodiment, a UE supports NGEN-DC configuration and operation, and local functions and capability sets of the UE and a secondary base station (SgNB) support an IMS Video service, and a master base station MeNB does not support the IMS Video service.

In step S1401, the UE is already in an NGEN-DC active state with the MeNB and an NGEN-DC active state with the SgNB.

In step S1402, an AMF/SMF prepares to initiate the IMS Video service. For security, the AMF/SMF first initiates an NGAP: UE RADIO CAPABILITY CHECK REQUEST message to the MeNB, where the NGAP: UE RADIO CAPABILITY CHECK REQUEST message contains terminal radio capability information related to the UE corresponding to E-UTRA and NR.

In step S1403, the MeNB further sends an XnAP: UE RADIO CAPABILITY CHECK REQUEST message to the SgNB, where the XnAP: UE RADIO CAPABILITY CHECK REQUEST message contains terminal radio capability information related to the UE corresponding to NR.

In step S1404, the SgNB returns an XnAP: UE RADIO CAPABILITY CHECK RESPONSE message to the MeNB, where the XnAP: UE RADIO CAPABILITY CHECK RESPONSE message contains capability indication information of whether the SgNB supports the IMS Video, such as: IMS Video Support Indicator with S-Node=supported.

In step S1405, according to the previous determination inside the MeNB that the master base station MeNB does support the IMS Video capability while the secondary base station SgNB supports the IMS Video capability, the MeNB returns an NGAP: UE RADIO CAPABILITY CHECK RESPONSE message to the AMF/SMF, where the NGAP: UE RADIO CAPABILITY CHECK RESPONSE message includes the capability indication information indicating support of the current serving MeNB and SgNB support the IMS Video respectively, for example: IMS Video Support Indicator=not supported represents that the MeNB does not support the IMS Video capability!; IMS Video Support Indicator with S-Node=supported represents that the SgNB supports the IMS Video capability!.

In step S1406, upon receipt of respective capability information indicating the support of the current master base station and the secondary base station to the IMS Video, the AMF/SMF subsequently initiates a PDU Session Resource Setup procedure including the IMS Video service, and the MeNB determines that the MeNB immediately shunts the PDU Session/QoS Flows including the IMS Video service to the SgNB for bearing according to the capability indication of the IMS Video Support Indicator with S-Node=supported and other RRM reference information (e.g., radio link coverage quality, node load of the master base station, and node load of the secondary base station) in step S1404.

Ninth Embodiment

Figure 15:
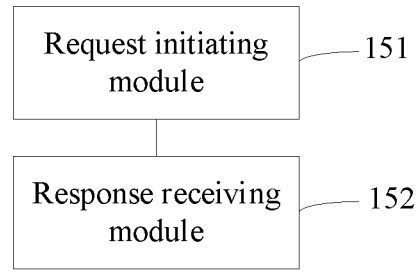
FIG. 15 is a schematic diagram illustrating composition of a network processing apparatus according to an embodiment of the present disclosure.

Reference is made to FIG. 15. FIG. 15 is a schematic diagram illustrating composition of a network processing apparatus according to a ninth embodiment of the present disclosure. The apparatus includes a request initiating module 151 and a response receiving module 152.

The request initiating module 151 is configured to initiate an NG interface terminal radio capability check request (NGAP: UE RADIO CAPABILITY CHECK REQUEST) message to a master base station, where the NGAP: UE RADIO CAPABILITY CHECK REQUEST message includes terminal radio capability information of a plurality of base stations accessed by a terminal via dual-connectivity or multi-connectivity.

The response receiving module 152 is configured to receive an NG interface terminal radio capability check response (NGAP: UE RADIO CAPABILITY CHECK RESPONSE) message fed back by the master base station, where the NGAP: UE RADIO CAPABILITY CHECK RESPONSE message at least carries indication information of whether the base stations support a specific service.

In some embodiments, the step of receiving the NGAP: UE RADIO CAPABILITY CHECK RESPONSE message fed back by the master base station may include the steps described below.

The master base station initiates an Xn interface terminal radio capability check request (XnAP: UE RADIO CAPABILITY CHECK REQUEST) message to a secondary base station, where the XnAP: UE RADIO CAPABILITY CHECK REQUEST message includes at least terminal radio capability information of a corresponding type for the secondary base station. That is, if the secondary base station (S-NG-RAN node) is a gNB, the XnAP: UE RADIO CAPABILITY CHECK REQUEST message includes terminal radio capability information, i.e. UE NR radio capability, of a UE corresponding to NR; if the secondary base station (S-NG-RAN node) is an ng-eNB, the XnAP: UE RADIO CAPABILITY CHECK REQUEST message includes terminal radio capability information, i.e. UE E-UTRA radio capability, of the UE corresponding to E-UTRA.

The secondary base station feeds back an Xn interface terminal radio capability check response (XnAP: UE RADIO CAPABILITY CHECK RESPONSE) message to the master base station, where the XnAP: UE RADIO CAPABILITY CHECK RESPONSE message carries indication information of whether the secondary base station supports a specific service. The "specific service" includes at least an IMS Voice service. That is, IMS Voice Support Indicator with S-Node=supported or not supported is carried. The above related information may be represented and borne by the single joint cell or the plurality of independent cells. The term "joint cell" and the term "joint indication information" hereinafter specifically refers to: when one of the master base station (MN) or the secondary base station (SN) can support the "specific service", the value of the IMS Voice Support Indicator is set to supported; when neither the master base station (MN) nor the secondary base station (SN) supports the "specific service", the value of the IMS Voice Support Indicator is set to not supported, there is thus no need to introduce a separate new cell IMS Voice Support Indicator with S-Node in this case.

The core network side receives the NGAP: UE RADIO CAPABILITY CHECK RESPONSE message which is fed back by the master base station according to the XnAP: UE RADIO CAPABILITY CHECK RESPONSE message, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the XnAP: UE RADIO CAPABILITY CHECK RESPONSE message to the master base station may include a step described below.

Indication information of whether the terminal supports the specific service under different RATs respectively is carried in the XnAP: UE RADIO CAPABILITY CHECK RESPONSE message. The indication information of whether the UE supports the specific service under different RATs including at least NR and E-UTRA is included.

In some embodiments, the master base station initiates the XnAP: UE RADIO CAPABILITY CHECK REQUEST message to the secondary base station before or after the core network side initiates the NGAP: UE RADIO CAPABILITY CHECK REQUEST message to the master base station.

In some embodiments, the step of receiving the NGAP: UE RADIO CAPABILITY CHECK RESPONSE message fed back by the master base station may include the steps described below.

The master base station initiates Xn interface 5G DC related procedure information to the secondary base station, where the Xn interface 5G DC related procedure information includes at least terminal radio capability information of a corresponding type for the secondary base station.

That is, if the secondary base station (S-NG-RAN node) is a gNB, the Xn interface 5G DC related procedure information includes terminal radio capability information of the UE corresponding to NR; if the secondary base station (S-NG-RAN node) is an ng-eNB, the Xn interface 5G DC related procedure information includes terminal radio capability information of the UE corresponding to E-UTRA.

The secondary base station feeds back Xn interface 5G DC related procedure response information to the master base station, where the Xn interface 5G DC related procedure response information carries indication information of whether the secondary base station supports the specific service. The specific service includes at least the IMS Voice service. That is, IMS Voice Support Indicator with S-Node=supported or not supported is carried. The above related information may be represented and borne by a single joint cell or a plurality of independent cells.

The core network side receives the NGAP: UE RADIO CAPABILITY CHECK RESPONSE message fed back by the master base station according to the Xn interface 5G DC related procedure response information, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the Xn interface 5G DC related procedure response information to the master base station may include a step described below.

Indication information of whether the terminal supports the specific service under different RATs respectively is carried in the Xn interface 5G DC related procedure response information. The indication information of whether the UE supports the specific service under different RATs including at least NR and E-UTRA respectively is included.

In some embodiments, the Xn interface 5G DC related procedure information includes any one of a secondary node addition request (S-NODE ADDITION REQUEST) message and a secondary node modification request (S-NODE MODIFICATION REQUEST) message.

When the Xn interface 5G DC related procedure information is the S-NODE MODIFICATION REQUEST message, the Xn interface 5G DC related procedure response information includes a secondary node addition request acknowledge (S-NODE ADDITION REQUEST ACKNOWLEDGE) message.

When the Xn interface 5G DC related procedure information is the S-NODE MODIFICATION REQUEST message, the Xn interface 5G DC related procedure response information includes a secondary node modification request acknowledge (S-NODE MODIFICATION REQUEST ACKNOWLEDGE) message.

In some embodiments, the master base station initiates the Xn interface 5G DC related procedure information to the secondary base station before or after the core network side initiates the NGAP: UE RADIO CAPABILITY CHECK REQUEST message to the master base station.

In some embodiments, the NGAP: UE RADIO CAPABILITY CHECK REQUEST message includes at least terminal radio capability information corresponding to two different RATs including NR and E-UTRA. In an embodiment, the indication information corresponding to different RATs including at least NR the E-UTRA of the UE, i.e. UE NR Radio Capability and UE E-UTRA Radio Capability, is included. The above terminal radio capability information corresponding to the different RATs may be represented and borne by a single joint cell or a plurality of independent cells.

In some embodiments, the specific service includes at least one of an IP multimedia subsystem (IMS) voice service or an IMS video service.

According to the network processing apparatus provided in the embodiment of the present disclosure, a core network side initiates an NGAP: UE RADIO CAPABILITY CHECK REQUEST message to a master base station, where the NGAP: UE RADIO CAPABILITY CHECK REQUEST message includes terminal radio capability information of a plurality of base stations accessed by a terminal via dual-connectivity or multi-connectivity; and then an NGAP: UE RADIO CAPABILITY CHECK RESPONSE message fed back by the master base station is received, where the NGAP: UE RADIO CAPABILITY CHECK RESPONSE message at least carries indication information of whether the base stations support a specific service. Thereby, the message interaction between the core network side and the base station achieves the support of the specific service of the base stations accessed by the terminal via the dual-connectivity or multi-connectivity, thus providing convenience for the user to select the corresponding base station to bear the specific service and ensuring the user experience.

Tenth Embodiment

Figure 16:
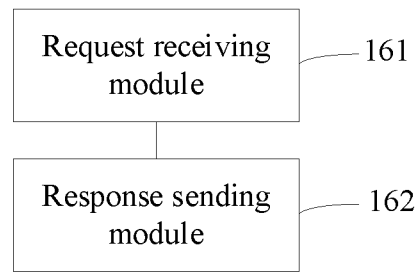
FIG. 16 is a schematic diagram illustrating composition of a network processing apparatus according to an embodiment of the present disclosure.

Reference is made to FIG. 16. FIG. 16 is a schematic diagram illustrating composition of a network processing apparatus according to a tenth embodiment of the present disclosure. The apparatus includes a request receiving module 161 and a response sending module 162.

The request receiving module 161 is configured to receive an NGAP: UE RADIO CAPABILITY CHECK REQUEST message initiated by a core network side, where the NGAP: UE RADIO CAPABILITY CHECK REQUEST message includes terminal radio capability information of a plurality of base stations accessed by a terminal via dual-connectivity or multi-connectivity.

The response sending module 162 is configured to feed back an NGAP: UE RADIO CAPABILITY CHECK RESPONSE message to the core network side, where the NGAP: UE RADIO CAPABILITY CHECK RESPONSE message at least carries indication information of whether the base stations support a specific service.

In some embodiments, the step of feeding back the NGAP: UE RADIO CAPABILITY CHECK RESPONSE message to the core network side includes the steps described below.

The master base station initiates an Xn interface terminal radio capability check request (XnAP: UE RADIO CAPABILITY CHECK REQUEST) message to a secondary base station, where the XnAP: UE RADIO CAPABILITY CHECK REQUEST message includes at least terminal radio capability information of a corresponding type for the secondary base station. That is, if the secondary base station (S-NG-RAN node) is a gNB, the XnAP: UE RADIO CAPABILITY CHECK REQUEST message includes terminal radio capability information, i.e. UE NR radio capability, of a UE corresponding to NR; if the secondary base station (S-NG-RAN node) is an ng-eNB, the XnAP: UE RADIO CAPABILITY CHECK REQUEST message includes terminal radio capability information, i.e. UE E-UTRA radio capability, of the UE corresponding to E-UTRA.

The secondary base station feeds back an Xn interface terminal radio capability check response (XnAP: UE RADIO CAPABILITY CHECK RESPONSE) message to the master base station, where the XnAP: UE RADIO CAPABILITY CHECK RESPONSE message carries indication information of whether the secondary base station supports a specific service. The "specific service" includes at least an IMS Voice service. That is, IMS Voice Support Indicator with S-Node=supported or not supported is carried. The above related information may be represented and borne by a single joint cell or a plurality of independent cells. The term "joint cell" and the term "joint indication information" hereinafter specifically refers to: when one of the master base station (MN) or the secondary base station (SN) supports the "specific service", the value of the IMS Voice Support Indicator is set to supported; when neither the master base station (MN) nor the secondary base station (SN) supports the "specific service", the value of the IMS Voice Support Indicator is set to not supported, there is thus no need to introduce a separate new cell IMS Voice Support Indicator with S-Node in this case.

The NGAP: UE RADIO CAPABILITY CHECK RESPONSE message is fed back to the core network side according to the XnAP: UE RADIO CAPABILITY CHECK RESPONSE message, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, the step in which the secondary base station feeds back the XnAP: UE RADIO CAPABILITY CHECK RESPONSE message to the master base station may include a step described below.

Indication information of whether the terminal supports the specific service under different RATs respectively is carried in the XnAP: UE RADIO CAPABILITY CHECK RESPONSE message.

The indication information of whether the UE supports the specific service under different RATs including at least NR and E-UTRA respectively is included.

In some embodiments, the master base station initiates the XnAP: UE RADIO CAPABILITY CHECK REQUEST message to the secondary base station before or after the core network side initiates the NGAP: UE RADIO CAPABILITY CHECK REQUEST message to the master base station.

In some embodiments, the step of feeding back the NGAP: UE RADIO CAPABILITY CHECK RESPONSE message to the core network side may include the steps described below.

The master base station initiates Xn interface 5G DC related procedure information to the secondary base station, where the Xn interface 5G DC related procedure information includes at least terminal radio capability information of a corresponding type for the secondary base station. That is, if the secondary base station (S-NG-RAN node) is a gNB, the Xn interface 5G DC related procedure information includes terminal radio capability information of the UE corresponding to NR; if the secondary base station (S-NG-RAN node) is an ng-eNB, the Xn interface 5G DC related procedure information includes terminal radio capability information of the UE corresponding to E-UTRA.

The secondary base station feeds back Xn interface 5G DC related procedure response information to the master base station, where the Xn interface 5G DC related procedure response information carries indication information of whether the secondary base station supports the specific service. The specific service includes at least the IMS Voice service. That is, IMS Voice Support Indicator with S-Node=supported or not supported is carried. The above related information may be represented and borne by a single joint cell or a plurality of independent cells.

The NGAP: UE RADIO CAPABILITY CHECK RESPONSE message is fed back to the core network side according to the Xn interface 5G DC related procedure response information, where the NGAP: UE RADIO CAPABILITY CHECK RESPONSE message carries indication information of whether the master base station and the secondary base station support the specific service respectively, or joint indication information of whether the master base station and the secondary base station support the specific service.

In some embodiments, feeding back, by the secondary base station, the Xn interface 5G DC related procedure response information to the master base station may include a step described below.

Indication information of whether the terminal supports the specific service under different RATs respectively is carried in the Xn interface 5G DC related procedure response information. The indication information of whether the UE supports the specific service respectively under different RATs including at least NR and E-UTRA respectively is included.

In some embodiments, the Xn interface 5G DC related procedure information includes any one of a secondary node addition request (S-NODE ADDITION REQUEST) message and a secondary node modification request (S-NODE MODIFICATION REQUEST) message.

When the Xn interface 5G DC related procedure information is the S-NODE ADDITION REQUEST message, the Xn interface 5G DC related procedure response information includes a secondary node addition request acknowledge (S-NODE ADDITION REQUEST ACKNOWLEDGE) message.

When the Xn interface 5G DC related procedure information is the S-NODE MODIFICATION REQUEST message, the Xn interface 5G DC related procedure response information includes a secondary node modification request acknowledge (S-NODE MODIFICATION REQUEST ACKNOWLEDGE) message.

In some embodiments, the master base station initiates the Xn interface 5G DC related procedure information to the secondary base station before or after the core network side initiates the NGAP: UE RADIO CAPABILITY CHECK REQUEST message to the master base station.

In some embodiments, the NGAP: UE RADIO CAPABILITY CHECK REQUEST message includes at least terminal radio capability information corresponding to two different RATs including NR and E-UTRA. In an embodiment, the indication information corresponding to different RATs including at least NR and E-UTRA of the UE, i.e. UE NR Radio Capability and UE E-UTRA Radio Capability, is included. The above terminal radio capability information corresponding to the different RATs may be represented and borne by a single joint cell or a plurality of independent cells.

In some embodiments, the specific service includes at least one of an IP multimedia subsystem (IMS) voice service or an IMS video service.

According to the network processing apparatus provided in the embodiment of the present disclosure, a core network side initiates an NGAP: UE RADIO CAPABILITY CHECK REQUEST message to a master base station, where the NGAP: UE RADIO CAPABILITY CHECK REQUEST message includes terminal radio capability information of a plurality of base stations accessed by a terminal via dual-connectivity or multi-connectivity; and then an NGAP: UE RADIO CAPABILITY CHECK RESPONSE message fed back by the master base station is received, where the NGAP: UE RADIO CAPABILITY CHECK RESPONSE message at least carries indication information of whether the base stations support a specific service. Thereby, the message interaction between the core network side and the base station achieves the support of the specific service of the base stations accessed by the terminal via the dual-connectivity or multi-connectivity, thus providing convenience for the user to select the corresponding base station to bear the specific service and ensuring the user experience.

Eleventh Embodiment

Figure 17:
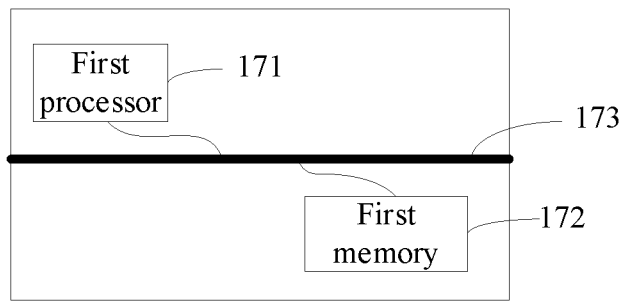
FIG. 17 is a schematic diagram illustrating composition of a core network according to an embodiment of the present disclosure.

Reference is made to FIG. 17. FIG. 17 is a schematic diagram illustrating composition of a core network according to this embodiment. The core network includes a first processor 171, a first memory 172 and a first communication bus 173.

The first communication bus 173 is configured to implement connection and communication between the first processor 171 and the first memory 172.

The first processor 171 is configured to execute a computer program stored in the first memory 172, so as to perform processes of the network processing methods in various embodiments above of the present disclosure, which are not repeated here.

Twelfth Embodiment

Figure 18:
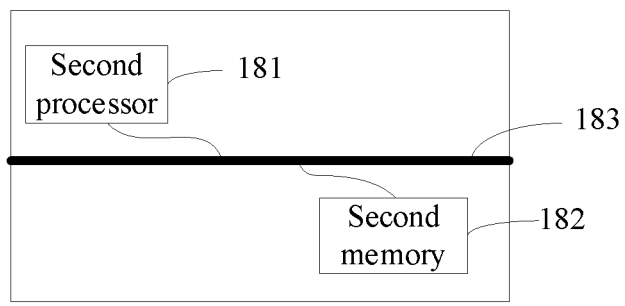
FIG. 18 is a schematic diagram illustrating composition of a base station according to an embodiment of the present disclosure.

Reference is made to FIG. 18. FIG. 18 is a schematic diagram illustrating composition of a base station according to this embodiment. The base station includes a second processor 181, a second memory 182 and a second communication bus 183.

The second communication bus 183 is configured to implement connection and communication between the second processor 181 and the second memory 182.

The second processor 181 is configured to execute a computer program stored in the second memory 182, so as to perform processes of the network processing methods in various embodiments above of the present disclosure, which are not repeated here.

Thirteenth Embodiment

This embodiment of the present disclosure provides a computer readable storage medium. The computer readable storage medium is configured to store one or more computer programs executable by one or more processor to implement the network processing methods in various embodiments above, which are not repeated here.

Apparently, it should be understood by those skilled in the art that each of the modules or the steps in the present disclosure above may be implemented by a general-purpose computing device. The modules or the steps may be concentrated on a single computing device or distributed on a network composed of multiple computing devices. Alternatively, the modules or the steps may be implemented by program codes executable by the computing devices, so that the modules or the steps may be stored in a storage medium (such as a read-only memory (ROM)/random access memory (RAM), a magnetic disk or an optical disk) and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. Therefore, the present disclosure is not limited to any particular combination of hardware and software.

The above content is a further detailed description of the present disclosure in conjunction with the specific embodiments, and the specific implementation of the present disclosure is not limited to the description. For those skilled in the art to which the present disclosure pertains, a number of simple deductions or substitutions not departing from the concept of the present disclosure may be made and should fall within the scope of the present disclosure.

INDUSTRIAL APPLICABILITY

The disclosure is applied to the technical field of mobile communications, thereby the message interaction between the core network side and the base station achieves the support of the specific service of the base stations accessed by the terminal via the dual-connectivity or multi-connectivity, thus providing convenience for the user to select the corresponding base station to bear the specific service and ensuring the user experience.

What is claimed is:

1. A network processing method, comprising:
    initiating, by a core network side, an NG interface terminal radio capability check request message to a master base station, wherein the NG interface terminal radio capability check request message comprises terminal radio capability information of a plurality of base stations accessed by a terminal via dual-connectivity or multi-connectivity; and
    receiving an NG interface terminal radio capability check response message fed back by the master base station, wherein the NG interface terminal radio capability check response message at least carries indication information of whether the base stations support a specific service under the dual-connectivity or the multi-connectivity.

2. The network processing method of claim 1, wherein receiving the NG interface terminal radio capability check response message fed back by the master base station comprises:
    initiating, by the master base station, an Xn interface terminal radio capability check request message to a secondary base station, wherein the Xn interface terminal radio capability check request message comprises at least terminal radio capability information of a corresponding type for the secondary base station;
    feeding back, by the secondary base station, an Xn interface terminal radio capability check response message to the master base station, wherein the Xn interface terminal radio capability check response message carries indication information of whether the secondary base station supports a specific service; and
    receiving, by the core network side, the NG interface terminal radio capability check response message fed back by the master base station according to the Xn interface terminal radio capability check response message, wherein the NG interface terminal radio capability check response message carries indication information of whether the master base station and the secondary base station support the specific service respectively, or joint indication information of whether the master base station and the secondary base station support specific service.

3. The network processing method of claim 2, wherein feeding back, by the secondary base station, the Xn interface terminal radio capability check response message to the master base station comprises:
carrying, in the Xn interface terminal radio capability check response message, indication information of whether the terminal supports the specific service respectively under different radio access type (RAT) systems.

4. The network processing method of claim 2, wherein the master base station initiates the Xn interface terminal radio capability check request message to the secondary base station before or after the core network side initiates the NG interface terminal radio capability check request message to the master base station.

5. The network processing method of claim 1, wherein receiving the NG interface terminal radio capability check response message fed back by the master base station comprises:
initiating, by the master base station, Xn interface 5G dual-connectivity (DC) related procedure information to a secondary base station, wherein the Xn interface 5G DC related procedure information comprises at least terminal radio capability information of a corresponding type for the secondary base station;
feeding back, by the secondary base station, Xn interface 5G DC related procedure response information to the master base station, wherein the Xn interface 5G DC related procedure response information carries indication information of whether the secondary base station supports a specific service; and
receiving, by the core network side, the NG interface terminal radio capability check response message fed back by the master base station according to the Xn interface 5G DC related procedure response information, wherein the NG interface terminal radio capability check response message carries indication information of whether the master base station and the secondary base station support the specific service respectively, or joint indication information of whether the master base station and the secondary base station support the specific service.

6. The network processing method of claim 5, wherein feeding back, by the secondary base station, the Xn interface 5G DC related procedure response information to the master base station comprises:
carrying, in the Xn interface 5G DC related flow response information, indication information of whether the terminal supports the specific service respectively under different RAT systems.

7. The network processing method of claim 5, wherein the Xn interface 5G DC related procedure information comprises any one of a secondary node addition request message and a secondary node modification request message;
in a case where the Xn interface 5G DC related procedure information is the secondary node addition request message, the Xn interface 5G DC related procedure response information comprises a secondary node addition request acknowledge message; and in a case where the Xn interface 5G DC related procedure information is the secondary node modification request message, the Xn interface 5G DC related procedure response information comprises a secondary node modification request acknowledge message.

8. The network processing method of claim 5, wherein the master base station initiates the Xn interface 5G DC related procedure information to the secondary base station before or after the core network side initiates the NG interface terminal radio capability check request message to the master base station.

9. The network processing method of claim 1, wherein the NG interface terminal radio capability check request message comprises at least terminal radio capability information corresponding to two different RAT systems including new radio (NR) and Evolved Universal Terrestrial Radio Access (E-UTRA).

10. The network processing method of claim 1, wherein the specific service comprises at least one of an IP multimedia subsystem (IMS) voice service or an IMS video service.

11. A non-transitory computer-readable storage medium, which is configured to store at least one computer program executable by at least one processor to implement the network processing method of claim 1.

12. A network processing method, comprising:
receiving, by a master base station, an NG interface terminal radio capability check request message initiated by a core network side, wherein the NG interface terminal radio capability check request message comprises terminal radio capability information of a plurality of base stations accessed by a terminal via dual-connectivity or a multi-connectivity; and
feeding back an NG interface terminal radio capability check response message to the core network side, wherein the NG interface terminal radio capability check response message at least carries indication information of whether the base stations support a specific service under the dual-connectivity or the multi-connectivity.

13. The network processing method of claim 12, wherein feeding back the NG interface terminal radio capability check response message to the core network side comprises:
initiating, by the master base station, an Xn interface terminal radio capability check request message to a secondary base station, wherein the Xn interface terminal radio capability check request message comprises at least terminal radio capability information of a corresponding type for the secondary base station;
feeding back, by the secondary base station, an Xn interface terminal radio capability check response message to the master base station, wherein the Xn interface terminal radio capability check response message carries indication information of whether the secondary base station supports a specific service; and
feeding back the NG interface terminal radio capability check response message to the core network side according to the Xn interface terminal radio capability check response message, wherein the NG interface terminal radio capability check response message carries indication information of whether the master base station and the secondary base station support specific service respectively, or joint indication information of whether the master base station and the secondary base station support the specific service.

14. The network processing method of claim 12, wherein feeding back the NG interface terminal radio capability check response message to the core network side comprises:
initiating, by the master base station, Xn interface 5G dual-connectivity (DC) related procedure information to a secondary base station, wherein the Xn interface 5G DC related procedure information comprises at least terminal radio capability information of a corresponding type for the secondary base station;
feeding back, by the secondary base station, Xn interface 5G DC related procedure response information to the master base station, wherein the Xn interface 5G DC related procedure response information carries indication information of whether the secondary base station supports a specific service; and
feeding back the NG interface terminal radio capability check response message to the core network side according to the Xn interface 5G DC related procedure response information, wherein the NG interface terminal radio capability check response message carries indication information of whether the master base station and the secondary base station support the specific service respectively, or joint indication information of whether the master base station and the secondary base station support the specific service.

15. A network processing apparatus, applied to a core network, comprising: a first processor, a first memory and a first communication bus;
wherein the first communication bus is configured to implement connection and communication between the first processor and the first memory; and
the first processor is configured to execute a computer program stored in the first memory, so as to perform the network processing method of claim 1.

16. A network processing apparatus, applied to a base station, comprising:
a second processor, a second memory and a second communication bus;
wherein the second communication bus is configured to implement connection and communication between the second processor and the second memory; and
the second processor is configured to execute a computer program stored in the second memory, so as to perform the network processing method of claim 1.

17. A non-transitory computer-readable storage medium, which is configured to store at least one computer program executable by at least one processor to implement the network processing method of claim 12.

* * * * *